United States Patent [19]
Schmidt

[11] Patent Number: 5,259,175
[45] Date of Patent: Nov. 9, 1993

[54] LAWN MOWER HEIGHT OF CUT ADJUSTMENT SYSTEM

[75] Inventor: Larry W. Schmidt, Farmington, Minn.

[73] Assignee: The Toro Company, Bloomington, Minn.

[21] Appl. No.: 981,142

[22] Filed: Nov. 24, 1992

[51] Int. Cl.⁵ .......................................... A01D 34/74
[52] U.S. Cl. .................................................. 56/17.2
[58] Field of Search ............... 56/17.2, 17.1, 16.7, 56/12.8, 13.4, 255

[56] References Cited

U.S. PATENT DOCUMENTS

| | | | |
|---|---|---|---|
| 2,961,251 | 11/1960 | Roberton | 280/43.21 |
| 3,114,229 | 12/1963 | Wilson | 56/25.4 |
| 3,972,160 | 8/1976 | Boswell | 56/255 |
| 4,835,952 | 6/1989 | McLane | 56/17.2 |
| 5,187,926 | 2/1993 | Rhoads | 56/17.2 X |

OTHER PUBLICATIONS

"Toro 21" Recycler Mower Operator's Manual, form No. 3314-706, copyright 1991.

*Primary Examiner*—Thuy M. Bui
*Attorney, Agent, or Firm*—Donald S. Trevarthen

[57] ABSTRACT

In a walk behind lawn mower, a height of cut adjustment system that includes a frame (12), a cutting blade (20) rotatably supported by the frame (12), a ground engaging wheel (14) coupled to and supporting the frame (12), height adjustment mechanism for adjusting the height setting of the blade (20) relative to the ground engaging wheel (14), and a grass height gauge (28) operatively connected to the frame (12) wherein the grass height gauge (28) indicates a desirable height setting for the cutting blade (20) so that a predetermined portion of the standing grass blade is removed.

17 Claims, 2 Drawing Sheets

LAWN MOWER HEIGHT OF CUT ADJUSTMENT SYSTEM

TECHNICAL FIELD

This invention pertains to lawn mower height of cut adjustment systems. More specifically, this invention pertains to a lawn mower height of cut adjustment system that incorporates a grass height gauge that indicates a desirable height setting for a grass cutting blade so that a predetermined portion of the standing grass blade is removed.

BACKGROUND OF THE INVENTION

Power lawn mowers typically incorporate a system for adjusting the height of cut of the lawn mower blade. For example, a typical rotary power mower that includes a rotary mower frame or deck, wheels supporting the deck, a handlebar assembly, a cutting blade, and an engine for rotating the blade wherein the motor is mounted on the deck, usually includes a system for adjusting the height of the cutting blade in relation to the ground over which the rotary mower sits or traverses. A typical height of cut adjustment system incorporates height adjustment mechanisms that are located between the rotary mower deck and the mower wheel assemblies. These height adjustment mechanisms typically are configured so that the operator can choose one of several height settings that best suits the mowing conditions. The mechanisms usually include a lever that is movable fore and aft to various detented positions wherein the detented positions represent various height settings for the mower blade. Actually, the mechanisms and their detented levers, which are interposed between the wheels and the mower deck, are configured so that movement of the detented levers raises or lowers the entire mower deck relative to the ground engaging wheels. Since the engine is mounted directly on the deck, the engine moves up and down with the deck as the deck's height is adjusted relative to the wheels by the height adjustment mechanisms. The blade, which is rotatably mounted on the engine, then moves up and down with the engine and the deck as the deck's height is adjusted relative to the wheels by the height adjustment mechanisms.

It is highly desirable to have the capability to adjust the blade up or down relative to the ground and grass to be cut. If one wants to cut the grass so that the grass blades are cut short, then the height adjustment mechanism levers are moved to a detented position where the deck, engine and blade are lowered to a position closer to the ground and grass. If the grass to be cut is quite thick or long, then it will be desirable to set the deck, engine and blade higher so that a smaller portion of the grass is cut off. If one tries to cut too much grass at once, the mower deck can clog with grass clippings and/or the mower engine can bog down or stall. This is especially true in mulching type mowers that cut and recut grass clippings without discharging the clippings through a side or rear discharge chute.

Determining how much grass to cut and at what height the blade should be set at is generally a subjective process. That is, the operator will typically survey the grass to be mowed and will then set the blade at a height that the operator deems proper. If the mowing performance is not adequate, the operator might have to change the height setting again to achieve an adequate cut. For example, if the mower encounters grass that is too thick or too long, the engine might begin to labor or bog down, or the grass clippings might begin to clump together and leave the freshly mowed area in a less than attractive condition. Again, mulching mowers are more prone to this condition, and proper blade height setting is critical to achieving an attractive grade of cut with a mulcher. To remedy this condition, the operator would need to raise the blade height so that smaller clippings are generated, thus reducing the volume of clipping mass underneath the mower deck.

If the blade had originally been set too low and, as a result, had scalped the lawn and ground in several places, then again the operator would have to stop the mowing process and raise the cutting blade to stop the scalping condition. Conversely, if the operator had originally set the blade too high and, while mowing, had determined that not enough grass was being cut, then the operator would have to lower the cutting blade so that a greater portion of the grass blade is removed.

Unfortunately, the operator typically has to guess at which height the blade should initially be set by surveying the grass conditions and then choosing a blade height setting that, in the operator's opinion, will do the best job of cutting the grass to a desirable level. When using a mulching mower, the operator's task is more difficult since the proper height of cut is critical to achieving an attractive grade of cut that is free of clumps of grass clippings.

One prior art lawn mower height of cut adjustment system is disclosed in U.S. Pat. No. 3,972,160 issued to Boswell on Aug. 3, 1976. In Boswell, the lawn mower 1 includes a body (frame) 2 which is supported by rear wheels 3 and front wheels (not numbered or shown). A height adjustment mechanism H is interposed between one of the rear wheels 3 and the body 2. The height adjuster mechanism H includes an adjusting lever 13 and a mating, numbered, detented slot member 19. The operator can move the lever 13 fore and aft within the slot member 19 to raise or lower the mower body 2. Since the engine and the blade are mounted directly on the body 2, the blade moves up or down with the body 2 when the body 2 is raised or lowered by the lever 13. In Boswell, a single height adjuster mechanism serves to raise or lower the body 2 through a series of interconnected rods and plates that pivot all four mower wheel assemblies so as to raise or lower the entire mower body. Boswell does not disclose any gauge for measuring the height of the grass blades to be cut. In fact, Boswell, in column 3, lines 16 through 22, discusses the need for the operator to adjust and readjust the height setting as the operator determines necessary.

Another prior art lawn mower height of cut adjustment system is disclosed in U.S. Pat. No. 3,114,229 issued to Wilson on Dec. 17, 1963. In Wilson, the lawn mower includes a deck 1 on a rotary lawn mower. The deck 1 has a motor 4 mounted on it. Wheels support the deck 1 and a handlebar 7 is connected to the deck 1, providing means for the operator to propel and control the mower. A blade height adjustment mechanism in the form of a cylindrical tube 20 is mounted on and extends vertically from the deck 1. The height adjustment tube 20 includes an adjustment knob 44. A set screw 52 which is threaded into the side wall of the cylindrical tube 20 engages the blade shaft assembly 5 which is journalled in and rotates within the tube 20. A cutting blade is attached to the lower end of the shaft 5 wherein the lower end of the shaft is underneath the deck 1. By rotating the set screw 52 counterclockwise, the shaft 5 is free to move up and down within the tube 20 and can be so moved by rotating the blade height adjustment knob 44. Since the blade is attached to the shaft 5, movement up or down of the shaft 5 moves the blade up or down relative to the deck 1 and the grass to be cut. The tube 20 also includes a set of markings 53 that are located adjacent to a blade height indicator 50 which moves up or down with the shaft 5 and blade. Once the operator has chosen a desired height setting by rotating the adjustment knob 44 and by referencing the blade height markings 53 on the tube 20 and the position of the indicator 50, the operator rotates the set screw 52 to restrain the shaft 5 from further up or down movement within the tube 20. Wilson does not disclose any gauge for measuring the height of the grass blades to be cut. The operator must estimate the height of the grass and guess at which blade height setting is most appropriate for the lawn to be mowed.

Another prior art lawn mower height of cut adjustment system is disclosed in U.S. Pat. No. 2,961,251 issued to Roberton on Nov. 22, 1960. Roberton discloses a lawn mower with a housing 10 supported by four wheels A handlebar assembly 15 is coupled to the deck 10. An internal combustion engine 12 is mounted on the deck 10 and rotatably drives a cutting blade (not shown). Wheel height adjustment assemblies are located between the deck 10 and the wheels 11. Blade and deck height adjustment is accomplished by pulling the wheel discs 43 out away from the wheel hubs and by then rotating the wheel discs in increments of 90 degrees to another detented position. The wheel discs 43 are marked in 90 degree increments with numerals indicating the actual height of the blade off of the ground wherein the numeral on the wheel disc 43 that is in the twelve o'clock high position is the current blade height. Roberton does not disclose any gauge for measuring the height of the grass blade to be cut. The operator must estimate the height of the grass to be cut and guess which blade height setting is most appropriate for a satisfactory cut.

Another prior art lawn height of cut adjustment system is disclosed in the "TORO 21" Recycler Mower Operator's Manual, form number 3324-706, copyright 1991. The "TORO" Operator's Manual discloses, on page 6, a lawn mower height of cut adjustment system that incorporates a wheel height adjuster mechanism that is interposed between the mower wheels and the mower deck. The wheel height adjuster includes a lever that is movable fore and aft. The fore or aft movement of the lever raises or lowers the deck, engine, and cutting blade. The wheel height adjuster also includes a set of notches in the deck for receiving and restraining the lever once a blade height is selected. Reference letters are located adjacent to the notches indicating the particular height setting of each wheel. The reference numerals enable the operator to compare the height settings of each particular wheel so that each wheel is set at the same height. The "TORO" Operator's Manual does not disclose a gauge for measuring the height of the grass to be cut. The operator must survey the grass to be cut and then estimate what the proper height setting should be to achieve a satisfactory cut. FIG. 7 on page 6 of the manual does provide a table showing the actual blade heights that correspond to each wheel height setting represented by a reference letter.

The present invention offers an alternate lawn mower height of cut adjustment system. In particular, a preferred lawn mower height of cut adjustment system according to the present invention incorporates a mower frame, a cutting blade rotatably supported by the frame, a ground engaging wheel coupled to and supporting the frame, means for adjusting the height setting of the blade relative to the ground engaging wheel, and a grass height gauge operatively connected to the frame wherein the grass height gauge indicates a desirable height setting for the cutting blade so that a predetermined portion of the standing grass blade is removed.

SUMMARY OF THE INVENTION

The present invention includes an improved lawn mower height of cut adjustment system.

Specifically, this invention includes, in a lawn mower height of cut adjustment system, a frame, a cutting blade rotatably supported by the frame, a ground engaging wheel coupled to and supporting the frame, means for adjusting the height setting of the blade relative to the ground engaging wheel, and a grass height gauge operatively connected to the frame wherein the grass height gauge indicates a desirable height setting for the cutting blade so that a predetermined portion of the standing grass blade is removed.

The frame can include a rotary mower cutting deck while the means for adjusting the height setting of the blade relative to the ground engaging wheel can include a height adjustment mechanism interposed between the frame and the ground engaging wheel wherein the mechanism includes a lever for selecting a desirable height setting of the blade.

The grass height gauge can include a set of first symbols on the wheel wherein each first symbol is different from all the other first symbols and where the first symbols are positioned so as to abut grass blades to be cut and indicate the grass height.

The height adjustment mechanism can include an indicator positioned adjacent to the lever where the indicator includes a set of second symbols corresponding to the first symbols and wherein the lever is movable to positions adjacent to the second symbol corresponding to the first symbol that is adjacent to the top of the grass blades.

The grass height gauge can include a set of special symbols on the wheel, wherein each special symbol is different from all the other special symbols and wherein the special symbols are positioned so as to abut grass blades and indicate grass height. The special symbols can be identical to the first symbols, wherein the first symbols and the special symbols are spaced apart on the gauge for indicating grass height and a desirable height setting of the cutting blade in varying grass conditions.

The first symbols, the second symbols, and the special symbols can include various colors and letters.

The grass height gauge can include a hub cap that is snap fit onto the ground engaging wheel.

BRIEF DESCRIPTION OF THE DRAWING

The invention will be further described with reference to the appended Drawing, wherein.

DETAILED DESCRIPTION OF THE PREFERRED EMBODIMENT

Figure 1:
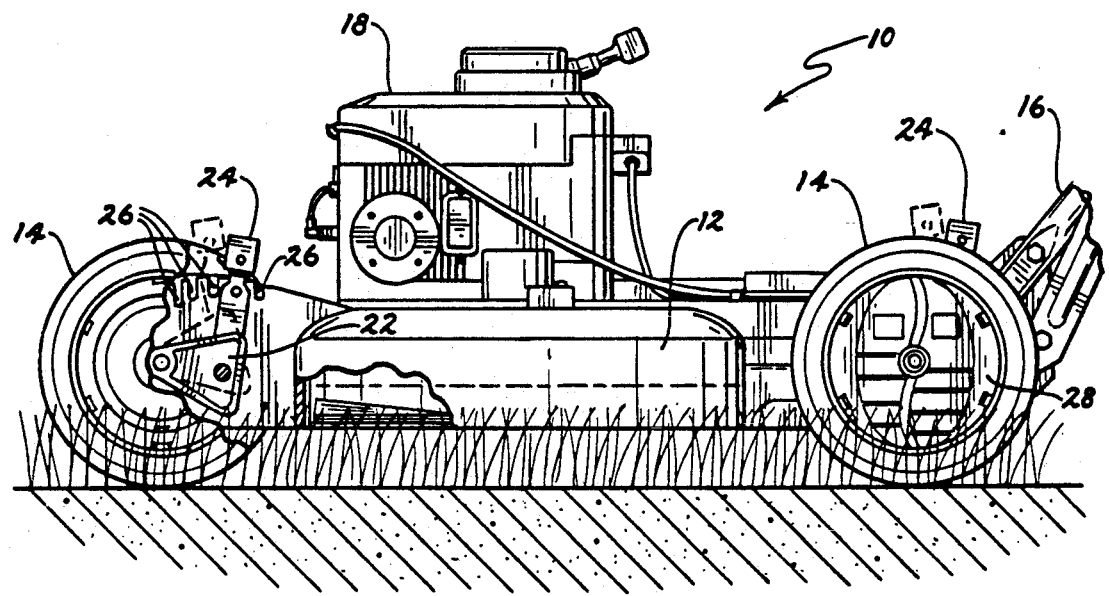
FIG. 1 is a left side elevational view of a lawn mower with a lawn mower height of cut adjustment system according to the preferred embodiment of the present invention.
Figure 2:
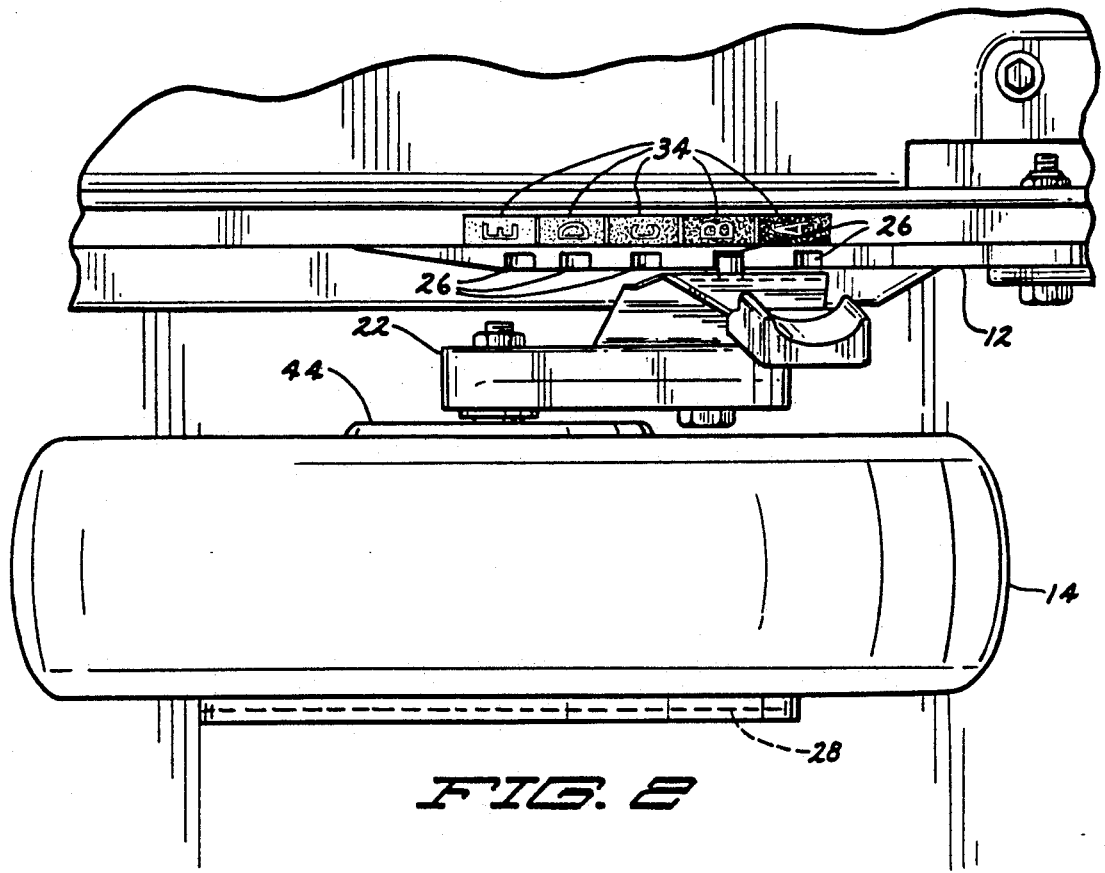
FIG. 2 is a partial top plan view of the preferred height of cut adjustment system of FIG. 1.
Figure 3:
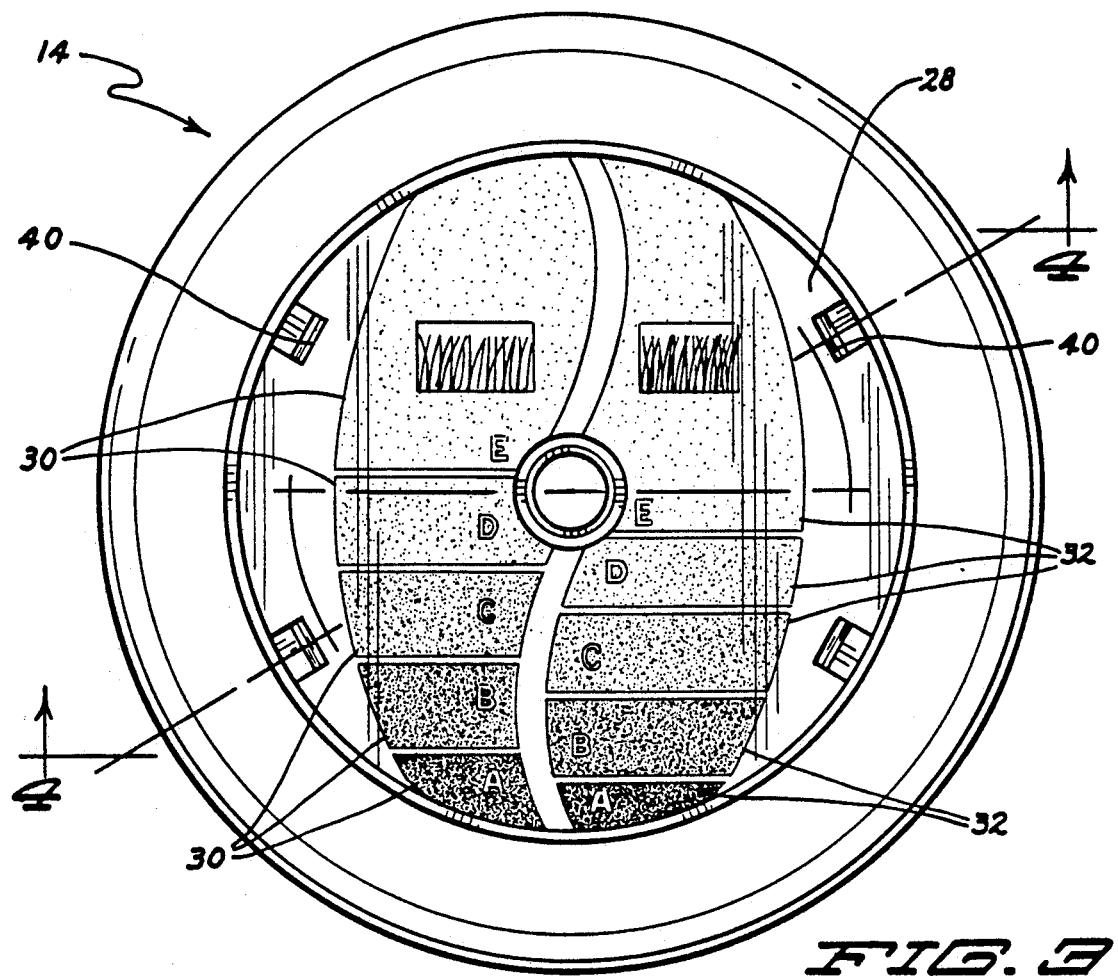
FIG. 3 is a left side elevational view of the preferred grass height gauge and wheel of the present invention.
Figure 4:
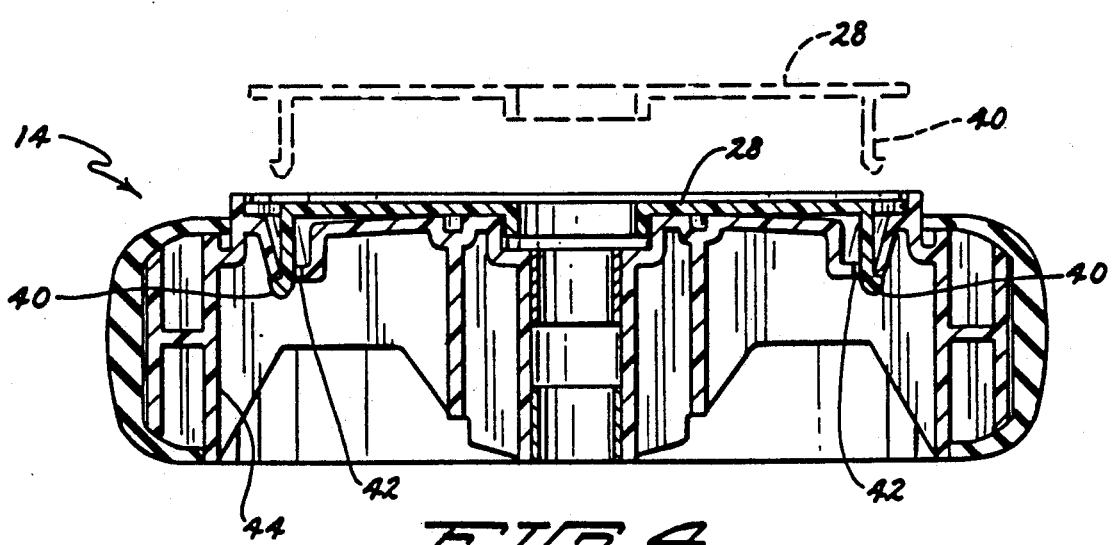
FIG. 4 is a cross-sectional view of the grass height gauge and wheel of FIG. 3.

In the Drawing, wherein like reference numerals designate like parts and assemblies throughout the several views, FIGS. 1 through 4 show a preferred lawn mower height of cut adjustment system on a rotary lawn mower 10. The mower 10 includes a deck 12 that is supported by four ground engaging wheels 14. A handlebar assembly 16 is pivotally connected to the mower deck 12 at the rearward portion of the deck 12. An internal combustion engine 18 is mounted directly on the deck 12. A cutting blade 20 is connected to the engine 18 crankshaft (not shown) wherein the blade 20 connects to the lower end of the crankshaft which is located underneath the deck 12.

Height adjuster mechanisms 22 are interposed between the ground engaging wheels 14 and the deck 12. Each height adjuster mechanism 22 includes a lever 24 which extends in an upward direction. Movement of any one of the levers 24 in a fore or aft direction will cause the height adjuster mechanism 22 connected with that particular lever 24 to raise or lower the deck 12 in relation to the ground engaging wheel 14 immediately adjacent to the lever 24 being moved. Since the blade 20 is coupled to the engine 18, which is mounted on the deck 12, raising the deck 12 raises the blade 20 while lowering the deck 12 lowers the blade 20.

To raise or lower the deck 12 so that the deck 12 remains parallel to the ground, all four height adjustment mechanisms 22 must be adjusted through the levers 24 so that the height setting of each adjuster mechanism 22 is equal to all the other adjuster mechanisms. To help achieve this, each lever 24 is spring loaded in a direction lateral to its fore and aft travel axis so as to be biased towards the deck 12. The deck 12 includes slots 26 for receiving and restraining the spring biased lever 24 which, when released by the operator, will spring back towards the deck 12 and will fall into one of the slots 26 on the deck 12. The slots 26 are cast into the deck 12 if the deck 12 happens to be a casting. If the deck 12 is a steel stamping, then the slots 26 are typically incorporated into a separate sheet metal piece which is attached to the deck 12 by welding or other fastening means. A reference symbol such as a letter or a number is positioned next to each slot 26 to aid the operator in identifying the proper height setting for all of the other height adjuster mechanisms 22. The symbols will be discussed in much greater detail below.

At least one wheel 14 includes a grass height gauge 28 that is coupled to the hub of the wheel 14 so that the grass height gauge 28 faces out from the wheel 14 and away from the mower deck 12. In the preferred embodiment, the grass height gauge 28 is a plastic hub cap that is snap fit onto the wheel hub. The gauge 28 "hub cap" includes male tabs 40 that are sized so as to snap fit into mating openings 42 in the wheel 14 hub 44. The snap fit of the male tabs 40 into the mating openings 42 in the hub 44 serves to securely retain the gauge 28 onto the wheel 14. If more than one grass height gauge 28 is used, they should all be identical to each other. The grass height gauge 28 includes a set of first symbols 30 that are comprised of a set of colored bars and a set of letters A through E wherein each letter is placed on one of the colored bars. The set of first symbols 30 are vertically placed on the gauge 28 with the A symbol and its corresponding color bar being in the lowest position and the E symbol and its corresponding color bar being in the highest position. The set of first symbols 30 are collectively named the "normal" setting symbols.

The grass height gauge 28 also includes a set of special symbols 32 that includes a set of colored bars and a set of letters A through E. The bars in the set of special symbols 32 are colored the same as the bars in the set of first symbols 30 and are vertically arranged in the same order as in the set of first symbols 30. However, the colored bars in the set of special symbols 32 are somewhat narrower than the bars in the set of first symbols 30 so that the total height of the stack of the set of special symbols 32 is somewhat lower than the total height of the stack of the set of first symbols 30. As with the set of first symbols 30, the letters A through E in the set of special symbols 32 are placed on the colored bars so that the A letter and its corresponding color bar are at the bottom of the vertical stack of special symbols 32 and the E letter and its corresponding color bar are at the top of the stack of special symbols 32. The set of special symbols 32 is collectively named the "Lush" symbols. The set of first symbols 30 and the set of special symbols 32 are placed side by side on the grass height gauge 28.

Since the grass height gauge 28 is actually a hub cap for the wheel 14 in the preferred embodiment, the gauge 28 rotates with the wheel 14. When the mower 10 is pushed into a grassy area, the grass height gauge 28 will come into contact with grass blades that are to be cut. The operator should look at the tops of the grass blades to see where on the grass height gauge 28 the tops of the grass height blades are in relation to either the set of first symbols 30 or the set of special symbols 32. If the lawn to be mowed is a thick, lush lawn, then the operator should look at the set of special symbols 32 also known as the "lush" symbols. The set of special symbols 32 (the "lush" symbols) are to be used when the lawn is thick and lush. If the lawn is "normal", not thick and lush, then the operator should look at the set of first symbols 30, also known as the "normal" set of symbols. In either case, the operator must make sure that the grass height gauge 28 "hub cap" is oriented so that the colored bars are stacked vertically in relation to the ground and so that the A letter is at the bottom of the stack of the symbols. The operator, after deciding whether to use the set of first symbols 30 for "normal" grass or the set of special symbols 32 for thick, lush grass, must make a note of the letter and color symbol that is located at the top of the grass blade. The operator must then compare the appropriate color and letter indicated on the grass height gauge 28 to the set of second symbols 34 that are described in detail below.

A set of second symbols 34 is located next to the detent slots 26 which are located on the deck 12. As discussed above, the detent slots 26 are integral with the deck 12 and are configured so as to receive and restrain the height adjustment mechanism lever 24. The slots 26 are cast into the deck 12, if the deck is constructed of a cast material, or are formed into a sheet metal bracket which is fastened to the deck 12 by one of many standard fastening means if the deck 12 is a steel stamping. The set of second symbols 34 is affixed to the deck 12 so that each of the set of second symbols 34 is positioned adjacent to the detent slots 26. The set of second symbols 34 comprises a series of color bars and a series of letters A through E. The color scheme, and, obviously, the letter series, is identical to the set of first symbols 30 and the set of special symbols 32.

Once the operator has determined, from the grass height gauge 28 and its set of first symbols 30 or set of special symbols 32, what letter (A, B, C, D, or E) and corresponding color bar is adjacent to the top of the grass blades, then the operator can position the lever 24 into the slot 26 that has a color bar and letter adjacent to it that matches the appropriate color bar and letter shown on the grass height gauge 28. For example, if the operator was about to mow a "normal" lawn and the tops of the grass blades were adjacent to the B letter and corresponding color bar on the set of first symbols 30 (the "normal" settings), then the operator would want to set the lever 24 of each height adjustment mechanism 22 so that the lever 24 rested in the slot 26 immediately adjacent to the second symbol 34 that included the B letter and the color bar matching the color bar on the set of first symbols 30 adjacent to the grass blade tops. If the operator was about to mow thick-lush grass and the tops of the grass blades were immediately adjacent to the E letter and corresponding color bar on the set of special markings 32 (the "lush" settings), then the operator would want to set the lever 24 of each height adjustment mechanism so that the lever 24 rested in the slot 26 immediately adjacent to the second symbol 34 that included the E letter and the color bar matching the color bar 30 adjacent to the grass blade tops. By setting the levers 24 and the height adjustment mechanisms 22 in this manner, the deck 12 and cutting blade 20 height will be set so that an appropriate amount of the grass blades will be cut. That is, the blade 20 height will be set so that "clumping" of grass clippings will be reduced while enough grass will be cut off so that the lawn looks freshly mowed. In the preferred embodiment, the symbols 30, 32, and 34 are arranged on the grass height gauge 28 and adjacent to the slots 26 so that approximately one-third of the grass blade is cut off.

The lawn mower height of cut adjustment system of the present invention takes the guesswork out of setting the cutting blade 20 height to a proper setting. By using the grass height gauge 28 as an indicator of grass height and by observing the symbols 30 and 32 on the gauge 28 that are adjacent to the tops of the grass blades, the operator can easily select a cutting blade height that will result in an appropriate amount of grass being cut off.

A preferred embodiment of the invention is described above. Those skilled in the art will recognize that many embodiments are possible within the scope of the invention. Variations and modifications of the various parts and assemblies can certainly be made and still fall within the scope of the invention. For example, this height of cut adjustment system could be used on a reel type mower where the height adjustment mechanisms raised and lowered the cutting reel and bedknife and frame assembly. The grass height gauge could be on the support wheel of the reel mower or the grass height gauge could be simply be attached to the frame of the reel mower in a manner that allowed the gauge to float up and down independently of the frame while following the ground.

In another embodiment, the height of cut adjustment system of the present invention could include a rotary mower where the grass height gauge was not attached to the ground engaging wheel but rather attached to the deck in a manner that allowed the gauge to float up and down independently of the frame while following the ground.

In another embodiment, the first set of symbols, the special set of symbols, and the second set of symbols would not have to consist of letters and colored bars that were identical to each other but could consist of sets of symbols that simply "corresponded" to each other such as an A-1, B-2, C-3, etc. regime. Again, it is clear that variations and modifications of the various parts and accessories can be made and still fall within the scope of the invention. Thus, the invention is limited only to the apparatus recited in the following claims, and equivalents thereof.

I claim:
1. A lawn mower height of cut adjustment system comprising:
   (a) a frame;
   (b) a cutting blade rotatably supported by said frame;
   (c) a ground engaging wheel coupled to and supporting said frame;
   (d) means for adjusting the height setting of said blade relative to said ground engaging wheel; and
   (e) a grass height gauge operatively connected to said frame;
wherein said grass height gauge indicates a desirable height setting for said cutting blade so that a predetermined portion of the standing grass blade is removed.

2. The height of cut adjustment system of claim 1, wherein said frame comprises a rotary mower deck.

3. The height of cut adjustment system of claim 1, wherein said means for adjusting the height setting of said blade relative to said ground engaging wheel comprises a height adjustment mechanism interposed between said frame and said ground engaging wheel wherein said mechanism comprises a lever for selecting a desirable height setting of said blade.

4. The height of cut adjustment system of claim 3, wherein said grass height gauge comprises a set of first symbols on said wheel, wherein each first symbol is different from all the other first symbols, said first symbols positioned so as to abut grass blades and indicate grass height.

5. The height of cut adjustment system of claim 4, wherein said height adjustment mechanism further comprises a set of second symbols corresponding to said first symbols whereby said lever is movable to positions adjacent to the second symbol corresponding to the first symbol that is adjacent to the top of the grass blades.

6. The height of cut adjustment system of claim 5, wherein said grass height gauge further comprises a set of special symbols on said wheel, wherein each special symbol is different from all the other special symbols, said special symbols being positioned so as to abut grass blades and indicate grass height.

7. The height of cut adjustment system of claim 6, wherein said special symbols are identical to said first symbols, and wherein said first symbols and said special symbols are spaced apart on said gauge for indicating grass height and desirable height setting of said cutting blade in varying grass conditions.

8. The height of cut adjustment system of claim 7, wherein said symbols comprise various colors and letters.

9. The lawn mower height of cut adjustment system of claim 3, wherein said grass height gauge comprises a hub cap that is snap fit onto said ground engaging wheel.

10. A lawn mower height of cut adjustment system comprising:
   (a) a frame;
   (b) a prime mover mounted on and supported by said frame;
   (c) a handlebar assembly operatively connected to said frame;
   (d) a cutting blade rotatably supported by said frame and operatively coupled to said prime mover;
   (e) a ground engaging wheel coupled to and supporting said frame;
   (f) a height adjustment mechanism interposed between said frame and said ground engaging wheel wherein said mechanism comprises a lever for selecting a desirable height setting of said blade; and
   (g) a grass height gauge operatively connected to said frame; wherein said grass height gauge indicates a desirable height setting for said cutting blade so that a predetermined portion of the standing grass blade is removed.

11. The height of cut adjustment system of claim 10, wherein said frame comprises a rotary deck.

12. The height of cut adjustment system of claim 11, wherein said grass height gauge comprises a set of first symbols on said wheel, wherein each first symbol is different from all the other first symbols, said first symbols positioned so as to abut grass blades and indicate grass height.

13. The height of cut adjustment system of claim 12, wherein said height adjustment mechanism further comprises a set of second symbols corresponding to said first symbols whereby said lever is movable to positions adjacent to the second symbol corresponding to the first symbol that is adjacent to the top of the grass blade.

14. The height of cut adjustment system of claim 13, wherein said grass height gauge further comprises a set of special symbols on said wheel, wherein each special symbol is different from all the other special symbols, said special symbols positioned so as to abut grass blades and indicate grass height.

15. The height of cut adjustment system of claim 14, wherein said special symbols are identical to said first symbols, wherein said first symbols and said special symbols are spaced apart on said gauge for indicating grass height and desirable height setting of said cutting blade in varying grass conditions.

16. The height of cut adjustment system of claim 15, wherein said symbols comprise various colors and letters.

17. The height of cut adjustment system of claim 11, wherein said grass height gauge comprises a hub cap that is snap fit onto said ground engaging wheel.

* * * * *

UNITED STATES PATENT AND TRADEMARK OFFICE
CERTIFICATE OF CORRECTION

PATENT NO. : 5,259,175

DATED : November 9, 1993

INVENTOR(S) : Larry W. Schmidt, Chad O. Kelly and Philip G. Stalpes

It is certified that error appears in the above-identified patent and that said Letters Patent is hereby corrected as shown below:

On the title page of the patent, after "[75]" please delete:

"Inventor: Larry W. Schmidt, Farmington, Minn."

Please insert:

--Inventors: Larry W. Schmidt, Farmington;
Chad O. Kelly, Bloomington;
Philip G. Stalpes, Corcoran, all of
Minnesota--

Signed and Sealed this

Tenth Day of May, 1994

Attest:

BRUCE LEHMAN

*Attesting Officer*     *Commissioner of Patents and Trademarks*